US012571312B2

(12) United States Patent
Kernozicky et al.

(10) Patent No.: US 12,571,312 B2
(45) Date of Patent: Mar. 10, 2026

(54) ADAPTIVE BLENDING SYSTEM AND METHOD FOR REMOVING RESIDUAL STRESS IN TURBINE ENGINE COMPONENT

(71) Applicant: RTX CORPORATION, Farmington, CT (US)

(72) Inventors: Garrett Kernozicky, Mansfield, CT (US); Iuliana Cernatescu, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/771,029

(22) Filed: Jul. 12, 2024

(65) Prior Publication Data

US 2026/0015941 A1     Jan. 15, 2026

(51) Int. Cl.
  *F01D 5/00*     (2006.01)
  *B23P 6/04*     (2006.01)
  *G01N 23/20008*     (2018.01)

(52) U.S. Cl.
  CPC .............. *F01D 5/005* (2013.01); *B23P 6/045* (2013.01); *G01N 23/20008* (2013.01)

(58) Field of Classification Search
  CPC .... F01D 5/005; B23P 6/045; G01N 23/20008
  See application file for complete search history.

(56) References Cited

U.S. PATENT DOCUMENTS

| 6,021,108 | A | * | 2/2000 | Arai | ................... | G11B 17/0436 |
| 6,084,196 | A | * | 7/2000 | Flowers | ................. | B23P 6/007 |
| | | | | | | 219/121.48 |

| 6,154,431 | A | * | 11/2000 | Arai | ................... | G11B 17/0436 |
| 6,314,076 | B1 | * | 11/2001 | Arai | ..................... | G11B 21/083 |
| 7,433,799 | B2 | * | 10/2008 | Lin | ......................... | B23P 6/002 |
| | | | | | | 702/167 |
| 8,221,841 | B2 | | 7/2012 | Rutz et al. | | |
| 10,156,140 | B2 | * | 12/2018 | Walker | .............. | B23K 26/0006 |
| 10,865,644 | B2 | * | 12/2020 | Walker | ................... | F01D 5/005 |
| 11,174,734 | B2 | * | 11/2021 | Dua | ....................... | F01D 5/005 |
| 12,318,877 | B2 | * | 6/2025 | Sawyers-Abbott | ..... | G06F 30/15 |
| 2005/0106998 | A1 | * | 5/2005 | Lin | ......................... | B24B 49/00 |
| | | | | | | 451/8 |
| 2005/0159840 | A1 | * | 7/2005 | Lin | .................... | G05B 19/4163 |
| | | | | | | 700/245 |
| 2014/0161618 | A1 | * | 6/2014 | Walker | ................... | B23K 26/20 |
| | | | | | | 219/121.64 |
| 2017/0298735 | A1 | * | 10/2017 | Walker | ................... | B23K 26/20 |
| 2020/0200011 | A1 | * | 6/2020 | Dua | ........................ | G01N 25/72 |
| 2023/0313685 | A1 | * | 10/2023 | Roberts | ................... | F01D 5/005 |
| | | | | | | 702/34 |

(Continued)

*Primary Examiner* — Lawrence Averick

(74) *Attorney, Agent, or Firm* — Millen, White, Zelano & Branigan P.C.; Nicholas D'Andrea

(57)     ABSTRACT

An adaptive blending system and method are disclosed. A blending operation is performed on defects of a turbine engine component based on an initial blending profile. The adaptive blending system ad method dynamically observes and detects strain data of the defects during the blending operation. The detected strain data of the defects are sent to a processor for analysis in a substantially real-time basis to obtain strain levels of the defects. The processor generates a strain level of a defect based on the detected strain data, and generates an adjusted blending profile for use in the blending operation.

8 Claims, 7 Drawing Sheets

(56) References Cited

U.S. PATENT DOCUMENTS

| | | | |
|---|---|---|---|
| 2023/0314341 A1* | 10/2023 | Sawyers-Abbott | B23P 6/002 |
| | | | 702/40 |
| 2023/0315932 A1* | 10/2023 | Yang | F01D 5/34 |
| | | | 703/7 |
| 2023/0315948 A1* | 10/2023 | Roberts | F01D 5/34 |
| | | | 703/1 |

* cited by examiner

ADAPTIVE BLENDING SYSTEM AND METHOD FOR REMOVING RESIDUAL STRESS IN TURBINE ENGINE COMPONENT

FIELD OF THE INVENTION

The subject matter disclosed herein relates to methods and systems for removing a residual stress from an engine component, and, in particular, to methods and systems for performing a blending operation on the engine component and dynamically adjusting a blending profile used in a blending operation to ensure that the residual stress is removed.

BACKGROUND OF THE INVENTION

Turbine engine components, such as turbine blades or bladed rotors, used in modern aircraft are exposed to extreme temperatures and forces during operation. Over time, they develop erosion damages, nicks, or cracks. The erosion damages, nicks, or cracks will cause a residual stress to the components. A conventional method for repairing the damages or cracks uses a turbine blade blending process to remove and polish damaged areas from effected components. This method aims to restore the blade's aerodynamic shape and structural integrity, ensuring optimal performance and safety. It also helps to mitigate further damage and could extend the life of a component before replacement becomes necessary. The blending process involves inspecting the damages on the effected regions of the components, grinding or polishing the effected regions, and smoothing out any irregularities on the surface of the turbine blade.

However, the conventional blending method mainly relies on the technician's skills for inspection and mistakes happened when some potential residual stress is not timely detected. Therefore, a method and a system for dynamically detecting the residual stress during the blending process is need.

SUMMARY OF THE INVENTION

The present disclosure is directed to, in a first aspect, a blending method. The method includes operating a blending process on a damaged region of an engine component based on a blending profile. While the blending process is in progress, the method observes and detecting repaired conditions of the damaged region to capture strain data of the damaged region using a sensing device. The method processes the strain data to generate adjustment data and to adjust the blending profile based on the adjustment data.

In addition to the embodiments disclosed above, the blending method further includes generating an adjusted blending profile based on the adjustment data, and continuing the blending process based on the adjusted blending profile.

In addition to the embodiments disclosed above, the blending method further includes emitting an X-ray beam on the damaged region during the blending process, detecting diffracted X-rays received from the damaged region, and converting the diffracted X-rays to a strain data; and sending the strain data to a processor for processing.

In addition to the embodiments disclosed above, the blending method further processes the strain data to obtain a strain level of the damaged region, compares the strain level with pre-set data stored in a database, and generates the adjustment data based on the comparison.

In addition to the embodiments disclosed above, the blending method further outputs the strain level to a user interface for review by an operator.

In addition to the embodiments disclosed above, the observing and detecting step of the blending method is performed periodically during the blending process.

In addition to the embodiments disclosed above, the observing and detecting step may also be performed constantly during the blending process.

In yet another embodiment, the present disclosure is directed to, in a second aspect, a method for repairing a turbine component. The method includes inspecting the turbine component which has at least one defect, generating an initial blending profile on the at least one defect, and performing a blending operation on the at least defect based on the initial blending profile to repair the turbine component. During the blending operation, the method dynamically observes and detects strain data of the at least one defect, adjusts the initial blending profile based on detected strain data to generate an adjusted blending profile, and alters the blending operation based on the adjusted blending profile.

In addition to the embodiments disclosed above, the observing and detecting step further includes emitting an X-ray beam on the at least one defect during the blending operation, detecting diffracted X-rays received from the at least one defect, converting the diffracted X-rays to the strain data, and sending the strain data to a processor for processing.

In addition to the embodiments disclosed above, the observing and detecting step captures strain data of the repaired condition of the at least one defect during the blending operation and sends the strain data to a processor for processing to generate the adjusted blending profile.

In addition to the embodiments disclosed above, the observing and detecting is performed periodically during the blending process.

In addition to the embodiments disclosed above, the observing and detecting may also be performed in substantially real-time during the blending process.

In addition to the embodiments disclosed above, the adjusted blending profile is generated by processing the strain data to obtain a strain level of the at least one defect and comparing the strain level with pre-set data stored in a database.

In addition to the embodiments disclosed above, the blending method further includes outputting the strain level to a user interface for review by an operator.

In yet another embodiments described above, the present disclosure is directed to, in a third aspect, a system for removing residual stress of a damaged turbine component. The system includes a blending tool for blending a damaged region of the damaged turbine component. The blending tool includes a blending head for blending and smoothing a surface of the damaged region. The blending tool performs a blending operation on the damaged region based on a blending profile and the blending tool is operable manually or automatically. The system also includes a sensing device for observing and sensing strain data of the damaged region during the blending operation. The sensing device detects drain data of the damaged region and sending the detected strain data to an analyzing device. The analyzing device is used for analyzing and processing the detected strain data to obtain adjustment data, which is used to adjust the blending profile.

In addition to the embodiments described above, the blending tool continues blending the damaged region based on an adjusted blending profile generated from the adjustment data.

In addition to the embodiments described above, the sensing device includes an X-ray tube for emitting an X-ray beam on the damaged region, and a detector for detecting diffracted X-rays received from the damage regions and sending the detected diffracted X-rays to the analyzing device for processing.

In addition to the embodiments described above, the sensing device is integrable with the blending tool.

In addition to the embodiments described above, the sensing device detects periodically the repaired conditions of the damaged region during the blending operation.

In addition to the embodiments described above, the sensing device detects, in substantially real-time, the repaired conditions of the damaged region during the blending operation.

BRIEF DESCRIPTION OF FIGURES

The features of the disclosure believed to be novel and the elements characteristic of the invention are set forth with particularity in the appended claims. The figures are for illustration purposes only and are not drawn to scale. The disclosure itself, however, both as to organization and method of operation, can best be understood by reference to the description of the preferred embodiment(s) which follows, taken in conjunction with the accompanying drawings in which:

DETAILED DESCRIPTION OF THE INVENTION

The embodiments of the present disclosure can comprise, consist of, and consist essentially of the features and/or steps described herein, as well as any of the additional or optional ingredients, components, steps, or limitations described herein or would otherwise be appreciated by one of skill in the art. It is to be understood that all concentrations disclosed herein are by weight percent (wt. %.) based on a total weight of the composition unless otherwise indicated.

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims.

The present disclosure is directed to a system and method for dynamically detecting and inspecting damaged regions and strains of turbine engine components while performing a blending process to repair damaged engine components. In this regard, the system and method disclosed herein detects damaged regions substantially in real time, sends detected data to a computing device for analysis, adjusts the blending process based on the analysis results, and continues the blending process with an adjusted blending operation until the damaged regions are repaired and the strains on the damaged regions become acceptable. This manner facilitates a more efficient blending operation to remove the residual stress from the damaged components.

Figure 1A:
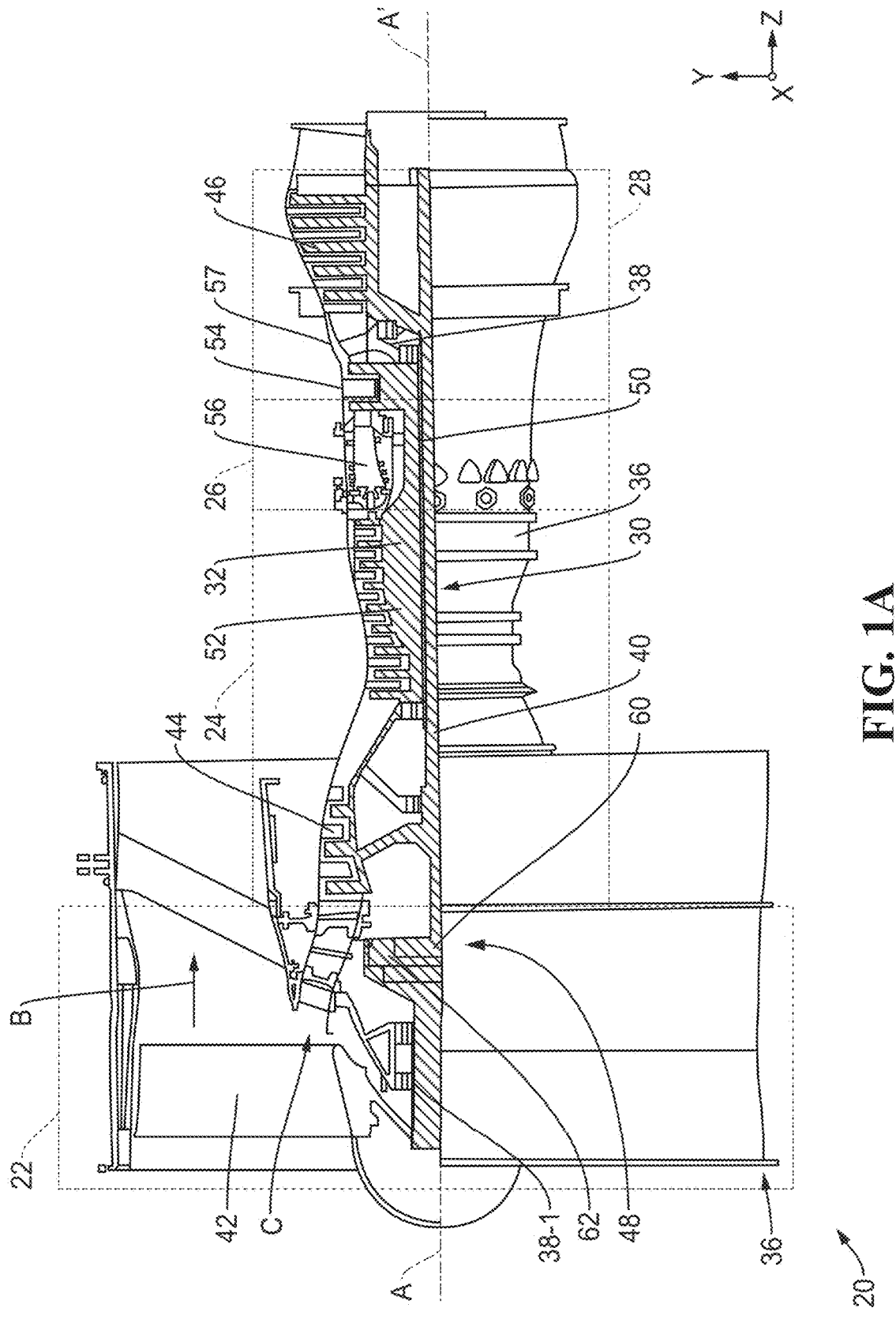
FIG. 1A is a cross-sectional view of a gas-turbine engine according to the disclosed embodiments.

FIG. 1A depicts a cross-sectional view of a gas-turbine engine 20 according to the disclosed embodiments. Gas-turbine engine 20 may be a two-spool turbofan that incorporates a fan section 22, a compressor section 24, a combustor section 26, and a turbine section 28. During operation, fan section 22 may drive air along a path of bypass airflow B while compressor section 24 can drive air along a core flow path C for compression and communication into combustor section 26 then expansion through turbine section 28. Although depicted as a turbofan gas engine 20 herein, it may be understood that the concepts disclosed herein are not limited to use with turbofans as the teachings may be applied to other types of turbine engines including three-spool architectures, single spool architecture, and the like.

Gas turbine engine 20 may include a low speed spool 30 and a high-speed spool 32 mounted for rotation about an engine central longitudinal axis A-A' relative to engine static structure 36 or engine case via several bearing systems 38, 38-1, and so on. Engine central longitudinal axis A-A' is oriented in the Z direction on the provides X-Y-X axes. It may be understood that various bearing systems 38 at various locations may alternatively or additionally be provided, including, for example, bearing system 38, bearing system 38-1, and so on.

Low speed spool 30 may include an inner shaft 40 that interconnects a fan 42, a low pressure compressor 44, and a low pressure turbine 46. Inner shaft 40 may be connected to fan 42 through a geared architecture 48 that can drive fan 42 at a lower speed than low speed spool 30. Geared architecture 48 may include a gear assembly 60 enclosed within a gear housing 62. Gear assembly 60 couples inner shaft 40 to a rotating fan structure. High speed spool 32 may include an outer shaft 50 that interconnects a high pressure compressor 52 and high pressure turbine 54.

A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. In some embodiments, a "high pressure" compressor or turbine experiences a higher pressure than a corresponding "low pressure" compressor or turbine.

The core airflow may be compressed by low pressure compressor 44 then high pressure compressor 52, mixed and burned with fuel in combustor 56, then expanded over high pressure turbine 54 and low pressure turbine 46. Turbines 46 and 54 rotationally drive the respective low speed spool 30 and high speed spool 32 in response to the expansion.

Figure 1B:
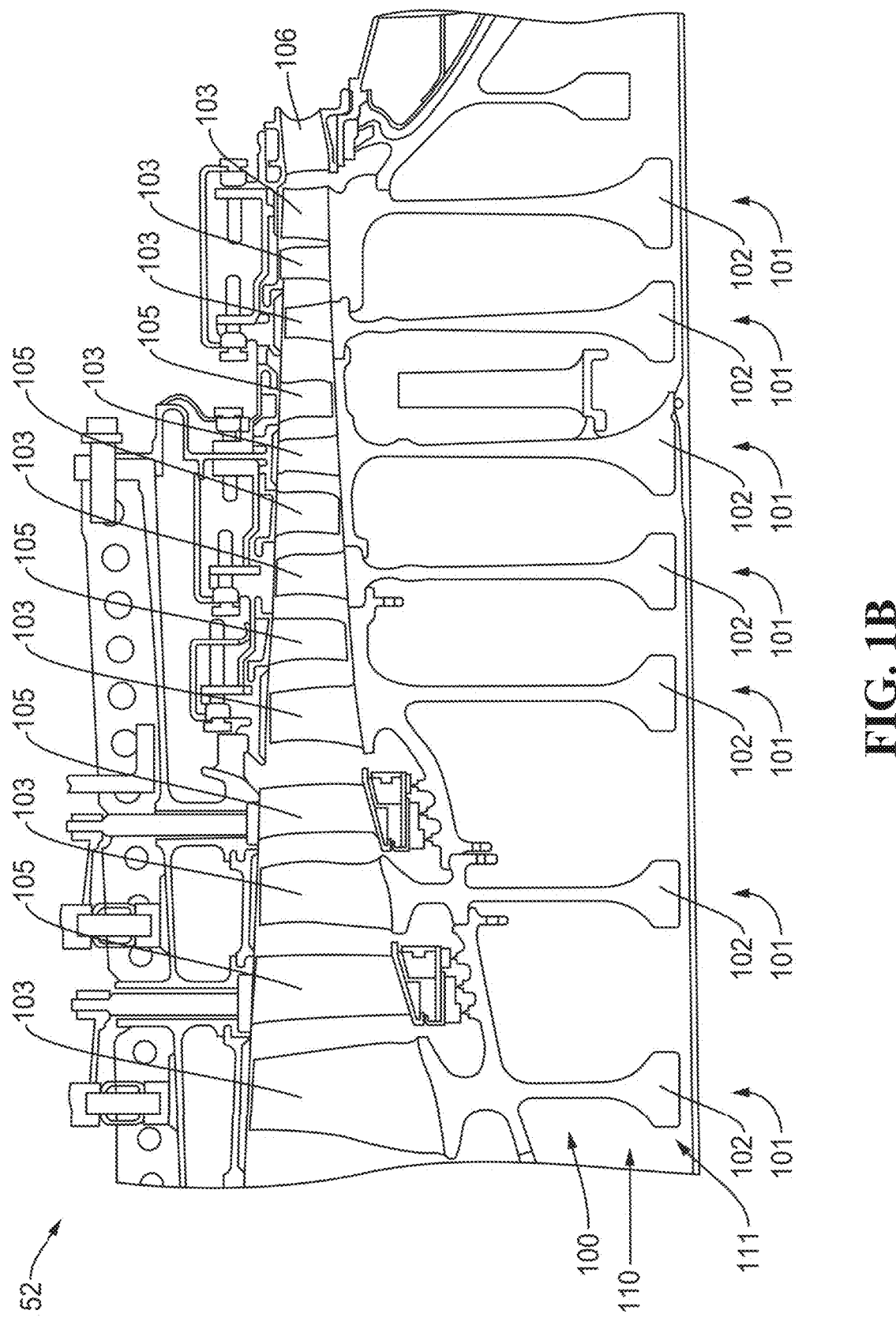
FIG. 1B is a cross-sectional view of a high pressure compressor according to the disclosed embodiments.

FIG. 1B depicts a cross-sectional view of a high pressure compressor 52 according to the disclosed embodiments. High pressure compressor 52 of compressor section 24 of gas turbine engine 20 is provided. High pressure compressor 52 includes a plurality of blade stages 101, or rotor stages, and a plurality of vane stages 105, or stator stages. Blade stages 101 may each include an integrally bladed rotor (IBR) 100, such that blades 103 and rotor disks 102 are formed from a single integral component, or a monolithic component formed of a single piece. In some embodiments, the inspection, analysis, and repair systems disclosed herein may be utilized with bladed rotors formed of separate blades 103 and rotor disks 102.

Blades 103 extend radially outward from rotor disk 102. Gas turbine engine 20 may further include an exit guide vane stage 106 that defines the aft end of high pressure compressor 52. In some embodiments, low pressure compressor 44 may include a plurality of blade stages 101 and vane stages 105, each blade stage in the plurality of blade stages 101 including IBR 100. In other embodiments, the plurality of blade stages 101 form a stack of IBRs 110, which define, at least partially, a rotor module 111 of high pressure compressor 52 of gas turbine engine 20.

Figure 2:
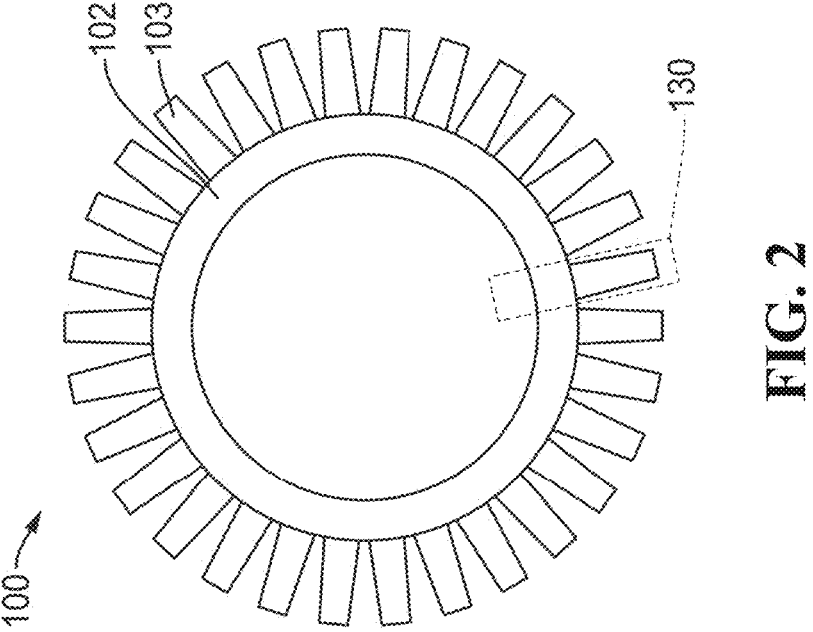
FIG. 2 is a front view of an integrally bladed rotor according to the disclosed embodiments.

FIG. 2 depicts a front view of an IBR 100 according to the disclosed embodiments. IBR 100 includes a rotor disk 102 and a plurality of blades 103 extending radially outward from rotor disk 102.

When debris is ingested into gas turbine engine 20, the debris may pass into the primary flowpath. Due to the rotation of blades 103 in the primary flowpath, the debris may contact one or more blades 103. This contact may cause damage or wear to a blade 103, or a set of blades 103. Thus, systems and methods are used for inspection, analysis, and repair of an IBR 100 to return the IBR back to service after inspection or repair. Portion 130 is shown for one of blades 103, and disclosed in greater detail by FIG. 3.

Figure 3:
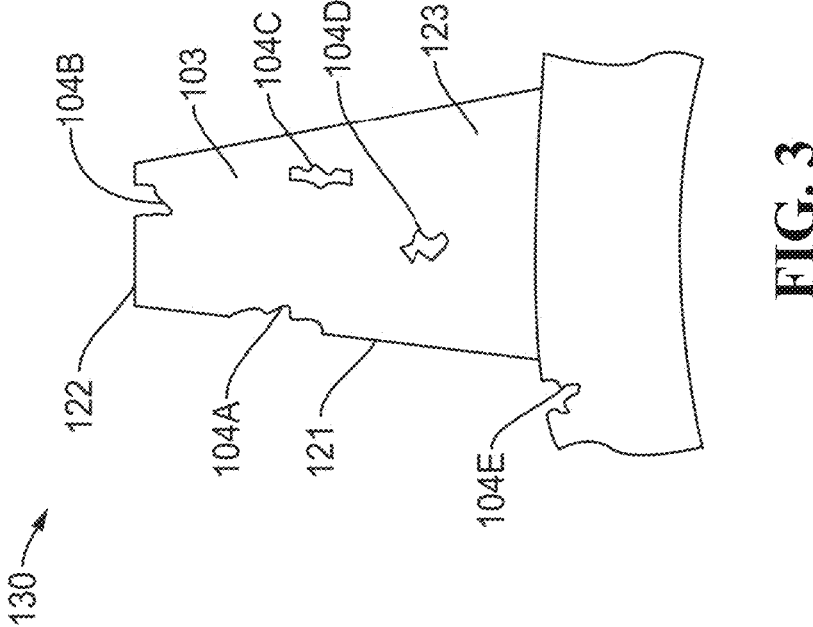
FIG. 3 is a front view of a damaged portion of integrally bladed rotor according to the disclosed embodiments.

FIG. 3 depicts a damaged portion 130 of IBR 100 according to the disclosed embodiments. Damaged portion 130 includes a number of defects 104A-E resulting from use of IBR 100 in gas turbine engine 20 over time. Defects may be caused by damage, wear, debris, and the like. The size and shape of defects 104A-E may be exaggerated for illustrative purposes within FIG. 3. In some embodiments, defects 140A-E may extend to all of blades 103 of IBR 100, rotor disk 102, a set of blades 103 of IBR 100, a single blade in blades 103, none of blades 103, and the like.

In order to repair one or all of defects 104A-E, they need to be identified and resolved such that IBR 100 can be re-introduced into service for further use. An blending operation may be performed on the damaged blade. A blending operation uses a material removal process, such as milling or computer numerical control (CNC) machining, to remove the damaged portions and smooth the resulting voids such that the blade can be re-introduced into service for further use if the repaired blade meets structural and/or aerodynamic criteria for further service. To make sure all damages are removed and to prevent any propagation of new damages caused by a residual stress, it is preferable to remove the damaged portion deeper than observed. The residual stress in a turbine engine is an internal stress that remains within a material even after external forces or temperature changes have been removed.

Figure 4:
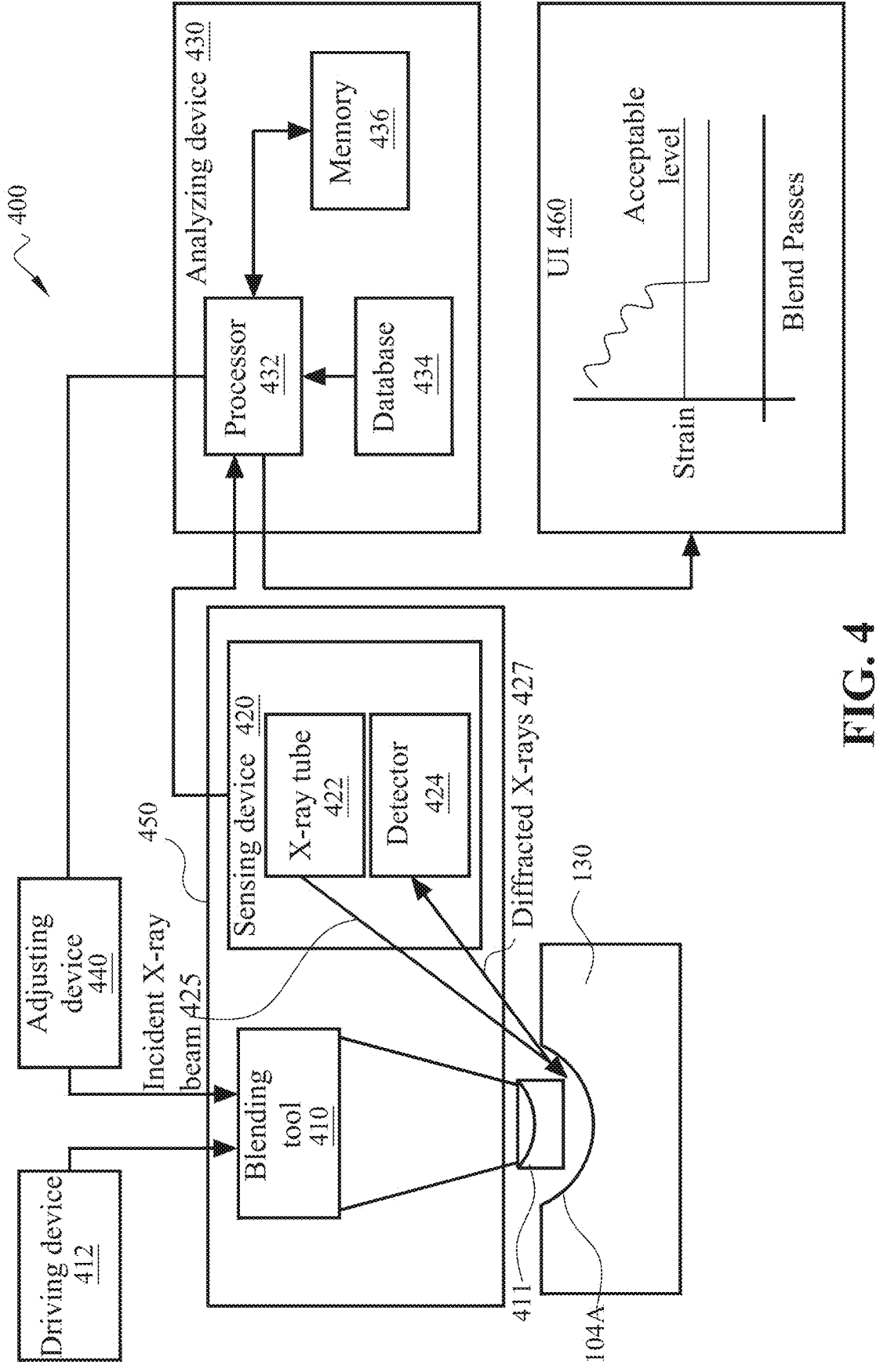
FIG. 4 depicts a system for removing a residual stress of a turbine engine component during a blending operation in accordance with the disclosed embodiments.

FIG. 4 depicts a system for removing a residual stress of a turbine engine component during a blending operation in accordance with the disclosed embodiments. System 400 includes, but is not limited to, a blending tool 410, a sensing device 420, an analyzing device 430, and an adjusting device 440. Blending tool 410 and sensing device 420 may operate at the same time. That is, while blending tool 410 is operating on a damaged region, sensing device 420 detects repaired conditions of the damaged region in a substantially real-time manner and sends the detected results to computing device 430 for analysis. In the disclosed embodiments, computing device 430 further calculates a strain existed in the damaged region based on the detected results.

Blending tool 410 has a blending head 411 that can be operated by driving device 412, including a motor or a robot, for example, to remove materials on a defect, such as defect 104A of damaged region 130 of IBR 100 as shown in FIG. 3, and to smooth a surface of the damaged region 130 after the materials are removed. Here, the term of damaged region 130 is used for all turbine components. It could be any component that has at least one defect and could be repaired with the blending operation.

Sensing device 420 detects the defect 104A before and after blending tool 410 starts the blending operation. Sensing device 420 may be a part of an inspecting system (not shown) that inspects damaged region 103 and composes a profile of defects on damaged region 130 before starting a repair operation. Sensing device 420 may also be a separate device from the inspecting system that is used during the blending operation. In various embodiments, sensing device 420 may be integrated with blending tool 410, as shown by reference number 450.

Sensing device 420 includes an X-ray tube 422 and a detector 424. X-ray tube 422 emits an X-ray beam 425 on defect 104A for inspecting a surface of defect 104A and the areas below, i.e., inspecting the repair conditions of the defect 104A. Sensing device 420 uses X-ray diffractions 427 to sense a surface residual stress under defect 104A. Detector 424 may include 2D or 3D detectors configured to capture X-ray diffractions received after the X-ray beam is emitted to the damaged region 104A and to convert them into data, such as strain data, and sends the data to analyzing device 430 for processing.

Sensing device 420 detects defect 104A during the blending operation of blending tool 410. In various embodiments, X-ray tube 422 is directed to defect 104A and detector 424 detects repaired data of defect 104A based on the X-ray diffraction received from X-ray tube 422 in substantially real time during the blending operation. Repaired data include strain data of defect 104A. Alternatively, sensing device 420 may detect defect 104A in a predetermined period of time, or at the end of one blending process, or as needed. Sensing device 420 may be a separate device from blending tool 410. Alternatively, sensing device 420 and blending tool 410 may be combined into a single device with a memory and a processor built therein for controlling the detecting timings. In various embodiments, blending tool 410 can be operable by an operator or by a robot and includes driving device 412 to control working functions of blending tool 410, including blending and smoothing powers, blending and smoothing working angles, intensities, vibrations, and so on. The present disclosure is not limited in this regard.

Analyzing device 430 includes a processor 432, a database 434, and a memory 436. Memory 436 may include a non-transitory, tangible, computer-readable medium (such as on a CD-ROM, DVD-ROM, hard drive, or FLASH memory) storing instructions that when executed, cause processor 432 to implement various logical operations. Some of the logical operations implemented by processor 432 are to process the X-diffraction data received from sensing device 420 to obtain digital data, to compare the digital data with data stored in database 434, to analyze repaired conditions based on the comparison results, to output graphic information on a user interface (UI) 460 to an operator, to send out adjustment data to adjusting device 440, and the like.

Analysis device 430 is a computing-based device. In various embodiments, analysis device 430 may be a cloud-based computing device that communicates with sensing device 420 and inspection system 450 via a network (not shown). However, the present disclosure is not limited in this regard. Analysis device 430 may be a machine learning device, for example, a deep neural network (DNN), an artificial neural network (ANN), or the like. In this regard, analyzing device 430 can be configured for machine learning to constantly expand experience based on criteria determined by system 400. Therefore, analyzing device 430 may include a port configured to couple to a hard drive, or any other device configured to transfer data obtained from sensing device 420 to processor 432. That is, processor 432 may be in direct communication with sensing device 420 and blending tool 410 (wired or wireless) or communicating with them via a network (not shown). Details regarding analyzing data detected during the blending operation and adjusting the blending operation will be described later with reference to FIGS. 6-7.

Figure 5:
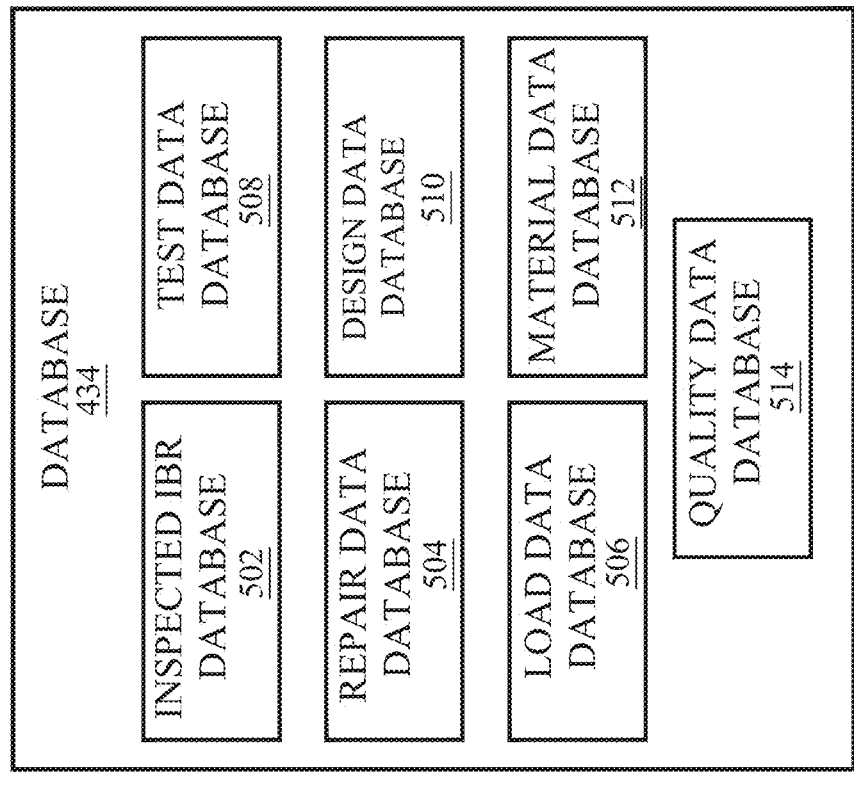
FIG. 5 depicts exemplary databases for use in the system of FIG. 4.

Database 434 comprises various stored data and criteria for use in the analyzing device 430. An example of various database included in database 434 is shown in FIG. 5. Database 434 may include inspected components database 502 storing data from previous inspected various components, repair data database 504 storing data from various prior performed/approved repairs, a load data database 506 storing engine load data from structural and/or aerodynamic analysis, test data database 508 with specific test data used of validation of structural and/or aerodynamic analysis from previous testing, design data database 510 with design models having nominal dimensions according to a product definition of turbine components, material data database 512 with material for each turbine component, and quality data database 514 with quality data associated with various quality information/disposition for known defect shapes, sizes, etc. Based on data and criteria stored database 434, processor 432 determines adjustment values for adjusting device 440 to adjust the blending profile for use in the blending process. The adjustment values may include an operating angle, operation time, an operating depth, a force intensity of blending tool 410, and so on.

Back to FIG. 4, in various embodiments, the operation angle, the operation time, the operation depth, and the force intensity of the blending tool 410 need to be controlled properly so as to obtain best repairing results. The strains of the damaged regions after repaired are also needed to be within an acceptable level in order to meet serviceable limits. Therefore, the disclosed embodiments aim to detect the repaired conditions and strains of the damaged regions during the blending operation so that the operation angle, the operation time, the operation depth, and the force intensity of the blending tool 410 can be adjusted dynamically during the blending operation until an acceptable strain level of the damaged region 130 is obtained.

Sensing device 420 in the disclosed embodiments utilizes an X-ray diffraction method (XRD) to capture data relating to the repaired condition of damaged region 130. As described above, X-ray tube 422 emits the X-ray beam to the surface of defect 104A of damaged region 130 during the blending operation, and detects diffracted X-rays received from defects 104A of damaged region 130. The diffracted X-rays may be converted into detected strain data at detector 424. Next, the detected strain data is sent to processor 432 for calculations. In various embodiment, sensing device 420 may send the diffracted X-rays to processor 432 directly, thereby converting the diffracted X-rays into the detected strain data at processor 432. Processor 432 calculates and determines the strain level of defect 104A of damaged region 130 based on the detected strain data. If the calculated strain level is higher than an acceptable level, processor 432 compares the calculated strain level with expectant based criteria stored in database 434 and from the comparison, determine adjusted measurements to be sent to adjusting device 440. Based on the adjusted measurements, adjustment device 440 adjusts the blending operation so that blending tool 410 can blend defect 104A of damaged region 130 with the adjusted blending operation. The blending operation, the detection of the repaired condition of damaged region 130, the calculation of the strain level, and the adjustment of the blending operation are performed and repeated in substantially real-time basis or dynamically until the strain level detected from damaged region 130 reaches or lower than the acceptable level.

In various embodiments, processor 432 may output a graphic display 462 on UI 460 for review by an operator. In the disclosed embodiment of FIG. 4, the graphic display 462 shows a diagram of strain levels of defect 104A with blend passes. The diagram of graphic display 462 shows that at the beginning of the blending operation, an initial strain level is much higher than the acceptable level. The initial strain level gradually reduces after several blend passes and finally reaches a level below the acceptable level. At this time, the blending process is considered completed and damaged region 130 is successfully repaired.

In accordance with the disclosed embodiments, the blending operation of blending tool 410 is adjusted automatically. However, the operation of blending tool 410 may also be adjusted manually based on the output information received from analyzing device 430. The present disclosure is not limited in this regard. Furthermore, the present disclosure is not limited to the X-ray diffraction method. Other methods, such as electron diffraction or neutron diffraction may also be used in various embodiments.

Figure 6:
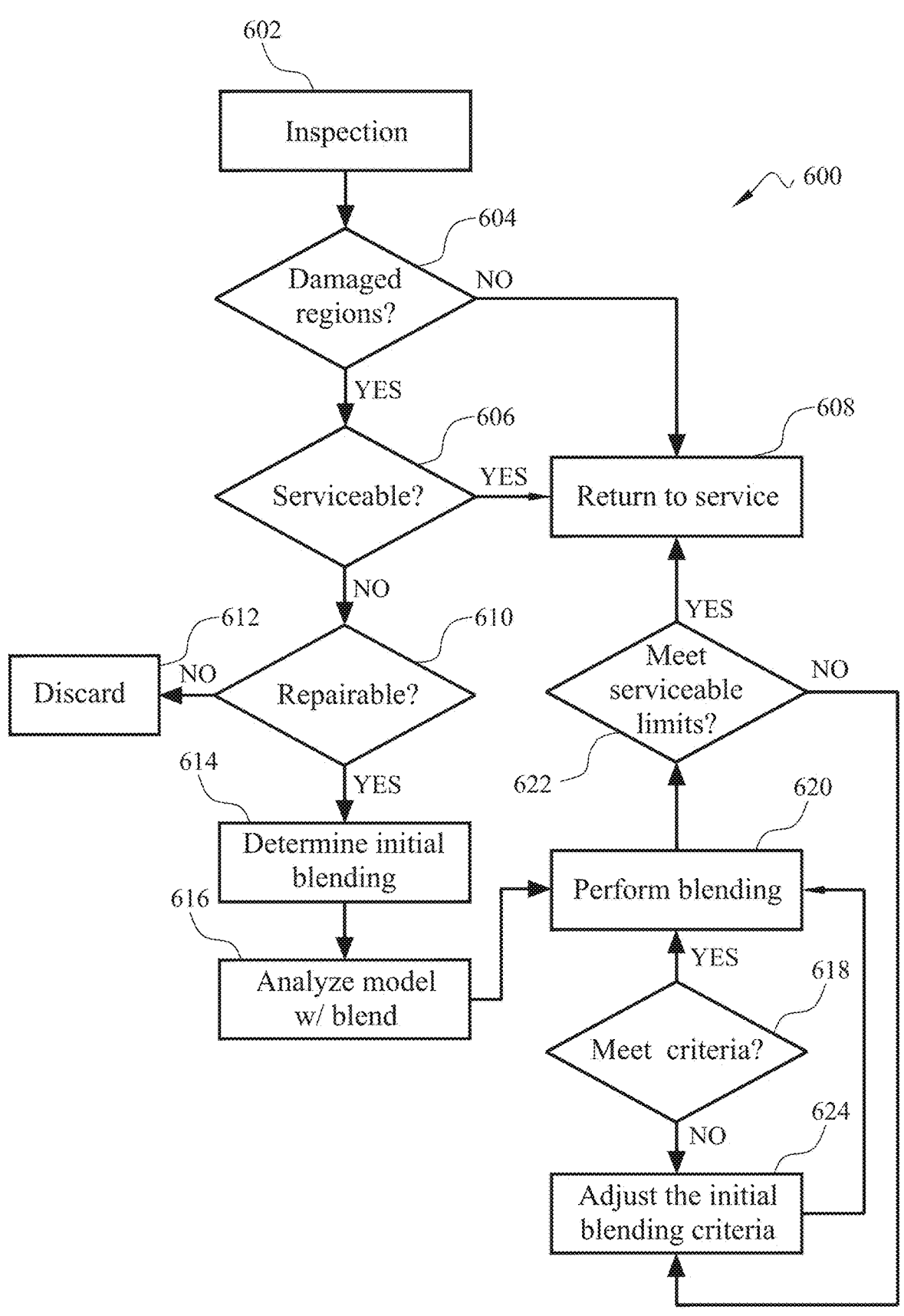
FIG. 6 depicts a flow chart of a process for inspecting and repairing a damaged region of a turbine component at an initial stage.
Figure 7:
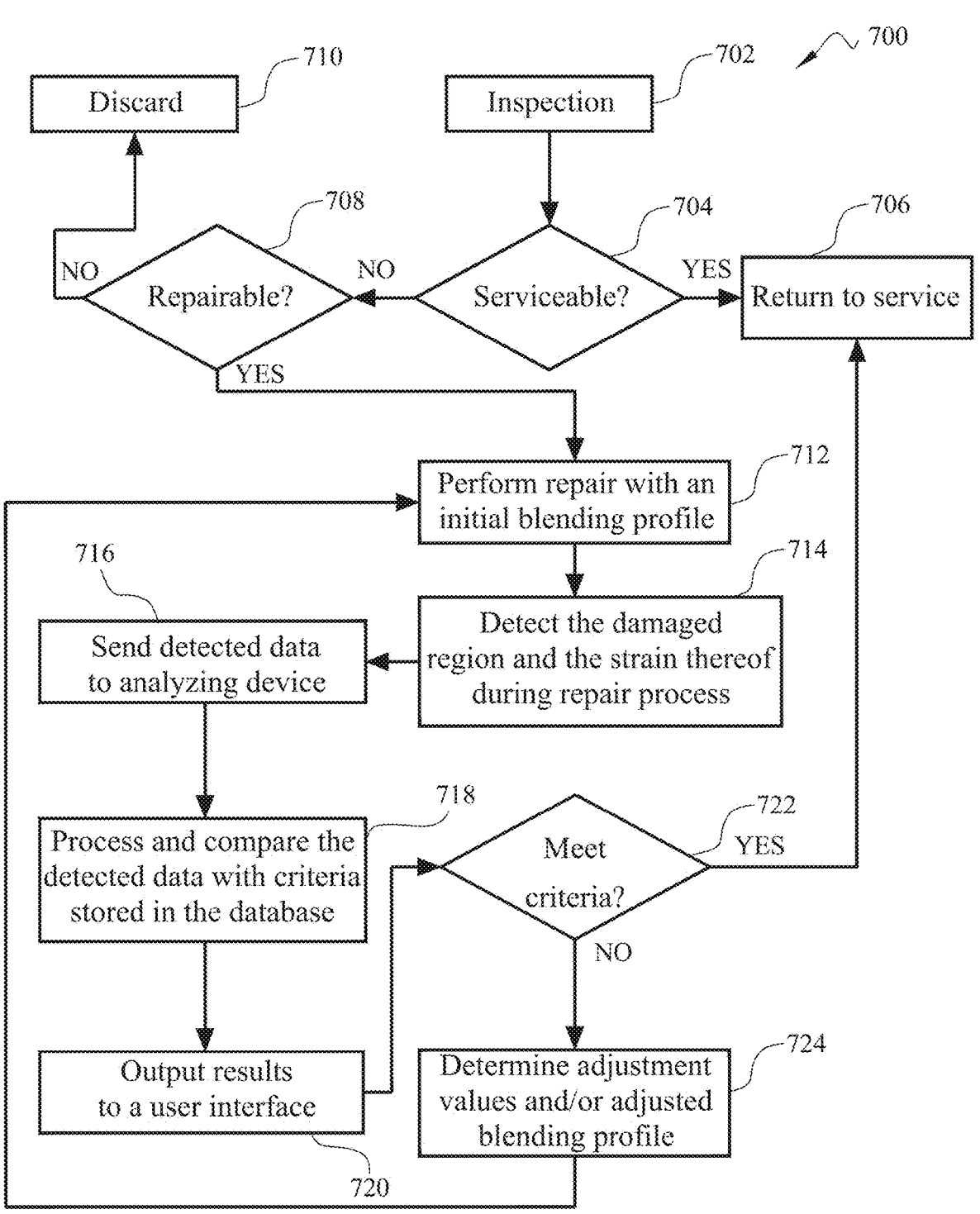
FIG. 7 depicts a flow chart of a process for repairing a damaged region of a turbine component with instant feedback of blending results and adjustment of a blending operation.

Various embodiments of methods for determining a repair quality of damaged region 130 in accordance with the disclosed disclosure are illustrated with reference to FIGS. 6-7. FIG. 6 depicts a flow chart 600 of a process for inspecting and repairing a defect of a turbine component of a gas-turbine engine at an initial stage. FIG. 7 depicts a flow chart 700 of a process for repairing a defect of a turbine component with instant feedback of blending results and adjustment of a blending operation.

Process 600 of FIG. 6 will be described below. Step 602 executes by inspecting a turbine component. Turbine component may be a blade or a bladed rotor of a compressor or a turbine. The inspection may be done in a regular basis or when needed. In various embodiments, the inspection can be performed by an inspection system or by use of an optical scanner.

Step 604 executes by determining if the turbine component has damaged regions. If no defect is found, the turbine component will be returned to service, shown as step 608. If at least one defect is found, step 606 executes by determining whether the defect will cause issues as described above, i.e, whether the turbine component still meets serviceable limits even at least one defect is presented. Here, the "serviceable limits" refers to objective parameter limits of defects (e.g., wear, damage, etc.) for the turbine component. For example, an objective parameter limit can be a threshold defect depth, a threshold defect length, a threshold aspect ratio, a threshold number of defects per blade, a threshold number of defects per component, any combination of the objective parameter limits, or the like. The present disclosure is not limited in this regard.

At step 604, any defect of the damaged regions may be graphical displayed in a 2D or 3D module, e.g., a Computer Aided Design (CAD) model or Finite Element Model (FEM), an aerodynamic model, or the like. If the FEM model or aerodynamic model determines that the defects will cause issues with running structural and/or aerodynamic simulations, an initial blending profile or initial repairing profile (i.e., showing an initial blend shape) may be generated or determined for the defects by the inspection system based on data generated at step 604. The following step 614 will further describe the initial blending profile or initial repairing profile.

Back to step 606, if the answer is NO, i.e., the turbine component fails to meet the serviceable limits, step 610 executes if the defect of the turbine component is repairable. If the defect of the turbine component is not repairable, then the turbine component will be discarded, at step 612.

When the defects of the turbine component are repairable, step 614 executes by generating an initial blending or repairing profile for respective defects found on the turbine component based on data obtained from the inspection step 604. In accordance with the disclosed embodiments, the initial blending profiles may be generated only for defects or damaged regions that do not meet the serviceable limits. In some embodiments, the initial blend profiles or repair blend profiles is generated for all damaged regions or defects.

Next, step 616 executes by analyzing the blending profiles with one or more of using the above-described (but not limited to) CAD, FEM, or aerodynamic models to determine if the initial blending profiles will cause issues in normal operations. At step 616, structural and aerodynamic simulations may be performed on a repaired component digital model. For example, the various simulations can include simulations to evaluate a model assurance criteria (MAC), a resonant frequency, an aerodynamic efficiency, a stall margin, damage tolerance, dynamic stress from vibration, or the like.

After analyzing the repaired component digital model, step 618 executes by determining whether experienced based criteria are met of each experience-based criteria parameter. If the simulation data from the various simulations show that the experience based criteria are met, process 600 continues with step 620, where the process 600 performs a repair operation on each of defects using the initial blending profile.

However, if the various simulations show that the experience based criteria are not met at step 618, more analyses will be performed on the defects by referring to data stored in database 502-514, as shown in FIG. 5. The analyses will be performed using analyzing device 430 of FIG. 4. After that, step 624 executes by generating adjustment values and sending them to the repair operation step 620 to adjust blending criteria for the blending operation.

Step 622 executes, after the blending operation at step 620 is completed, by determining whether the turbine component after repair meets the serviceable limits. If the answer is Yes, then the component is considered repaired successfully and will be returned to service, as shown in step 608. If the answer is No, then process 600 will return to step 624 for further adjusting blending criteria, and repeat steps 620 and 622.

Various embodiments according to the present disclosure will be further explained in process 700 of FIG. 7. In FIG. 7, steps 614 and 616 of FIG. 6 are omitted for brevity. The omissions of these steps, however, do not mean that generating the initial blend profile and analyzing the initial blend profile using the FEM model, CAD model or the aerodynamic model are no longer needed. The present disclosure is not limited in this regard.

Process 700 will be described in the followings. First, step 702 executes by inspecting a turbine component. This step is the same as step 602.

Step 704 executes by determining whether the turbine component has damaged regions or defects and whether it still meet the serviceable limits.

If the answer at step 704 is Yes, then there is no need to repair the turbine component and the component can be returned to service at step 706. However, if the answer at step 704 is Yes, step 708 executes by determining if the defect is repairable.

At step 708, if the defect is not repairable (NO), step 710 executes by discarding the damaged turbine component. However, if the defect is repairable (YES), step 712 executes by performing blending operation on the defect. As described in FIG. 6, an initial blending profile and simulating the blending profile using one suitable model may be performed as an initial step for the blending operation. Those steps are omitted from FIG. 7 for brevity.

Step 714 executes by detecting the defects and strain thereof simultaneously with the blending operation. The detecting step may be done by sensing device 420 of FIG. 4. In various embodiments, the detection may be done constantly during the blending operation. However, the detection may also be done periodically or at the end of each blending process, by demand or as needed, without limitation.

Step 716 executes by sending detected data to analyzing device 430 of FIG. 4. As described in FIG. 4, X-ray tube 422 of sensing device 420 emits an X-ray beam on the defect of the repairing component and detector 424 detects diffracted X-rays from the defect to generate strain data to be sent to analyzing device 430 for analysis.

Step 718 executes by processing the detected strain data received from sensing device 420 to generate a strain level of the defect, and comparing the strain level with expected criteria by referring to data stored in database 501-518. Step 718 can be performed at process 432 of analyzing device 430. At step 718, processor 432 calculates and measures blending profiles for each defect captured during the blending operation. At the same time, processor 432 calculates the strain level based on the detected digital data. A set of data indicating detected results of repair, including the strain level, are therefore generated.

Step 720 executes that outputting the detected results of repair to a user interface, such as UI 460 of FIG. 4 for an operator's review. The detected results of repair may be a graphical diagram showing the strain of the damaged regions or defects detected during the blending operation, as shown in FIG. 4.

Based on the detected results of repair, step 720 executes by determining whether the detected results of repair meet the expected criteria. If the detected results meet the expected criteria (i.e., the answer is Yes,) the damaged component is considered repaired successfully and no more repair operation is needed. The repaired component is therefore returned to service at step 706. Here, the expected criteria includes a predetermined acceptable strain level.

If the detected results do not meet the expected criteria (i.e., the answer is No,) process 700 goes to step 724, wherein adjustment values are determined. The adjustment values may include, but not limited to, how much more defect surface to be removed, an operation angle, an operation depth, and an operation force or intensity of the blending tool, and so on. The adjustment values are used to adjust the repair or blending operation and the adjusted blending operation is then applied to the repair operation at step 712. The disclosed embodiments may repeat the steps 712-724 several times until the detected results of repair meet the expected criteria at step 722. As mentioned previously, one example of the expected criteria is that the strain level detected on the damaged region meets the acceptable level. At this time, the blending operation is considered completed and the repaired component is returned to service, as shown at step 706.

Although not shown in the drawings, the damaged component after repair may go through a series of tests before sending it back to service. Such tests are to make sure the repaired component meets all serviceable conditions so that they can work properly in a turbine engine.

It is noted that the disclosed embodiments detect the damaged regions during the blending operation and sends real-time feedbacks to analyzing device 430 for analyses. Analyzing device in turns sends adjustment signals to dynamically alter blending directions, blending intensities, etc. of blending tool 410. Sensing device 420 uses the XRD method to more easily understand the surface residual stress. Detecting the damaged regions while the blending operation is performed, an advanced blending operation can be achieved. Instead of relying on manual blending methods, the adaptive blending system of the disclosed embodiments provides an automated adaptive blending method which leverages damage maps and highly accurate robotics/milling machines to implement a customized blend solution.

A customizable blend solution may be created for a specific part and damaged location which addresses not only geometric considerations, but also, using methods such as the XRD method, can more precisely detect the surface residual stress. This allow an optimized material removal and a more precise stress state of the component so that the optimized life for the component can be achieved. Various embodiments can be implemented by customizing different algorithms based on customers' defined solutions, and by dynamically changing or altering the solution through real-time feedbacks.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing than the appended claims, in which reference to an element is the singular is not intended to mean "one and only one" unless explicitly so stated, but rather "one or more". Moreover, wherein a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

While the present disclosure has been particularly described, in conjunction with specific preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present disclosure.

What is claimed is:

1. A method for performing a blending operation on a damaged engine component, the method comprising:

operating the blending operation on a damaged region of the damaged engine component based on an initial blending profile;

detecting repaired conditions of the damaged region while the blending operation is performed, wherein the detecting captures strain data of the damaged region using a sensing device, and wherein the detecting is performed either periodically during the blending process or substantially real-time during the blending process;

processing the strain data to calculate a detected strain level;

adjusting the blending profile if the detected strain data fails to meet predetermined criteria, wherein the predetermined criteria includes an acceptable strain level; and operating the blending process on the damaged region based on an adjusted blending profile, wherein the blending operation is completed when the detected strain level of the damaged region meets the acceptable strain level.

2. The blending method of claim 1, wherein the steps of detecting the repaired condition, adjusting the blending profile, and operating the blending process based on the adjusted blending profile are repeated until the predetermined criteria are met.

3. The blending method of claim 1, wherein the sensing device emits an X-ray beam on the damaged region during the blending operation;

detecting diffracted X-rays received from the damaged region;

converts the diffracted X-rays to the strain data; and sending the strain data to a processor for processing.

4. The blending method of claim 3, wherein the processor converts the strain data into digital data, compares the digital data with the predetermined criteria to calculate a detected strain level of the damaged region at the time when the repaired data is detected, wherein the predetermined criteria is stored in a database, and generates the adjustment data to adjust the blending profile if the strain level fails to meet an acceptable strain level.

5. The blending method of claim 1, further comprising outputting the image data to a user interface for review by an operator.

6. The method of claim 1, wherein the adjusting the blending profile if the detected strain data fails to meet predetermined criteria includes adjusting an operating angle, and operation time, an operating depth, and/or a force intensity of a blending tool.

7. The method of claim 1, wherein the adjusting the blending profile if the detected strain data fails to meet predetermined criteria occurs automatically.

8. The method of claim 1, wherein the predetermined criteria further include a threshold defect depth, a threshold defect length, a threshold aspect ratio, a threshold number of defects per blade, and/or a threshold number of defects per component.

* * * * *